Aug. 12, 1969   H. G. HIRSBRUNNER   3,461,272
ELECTRO-THERMAL LOGIC APPARATUS
Filed Sept. 18, 1967   2 Sheets-Sheet 1
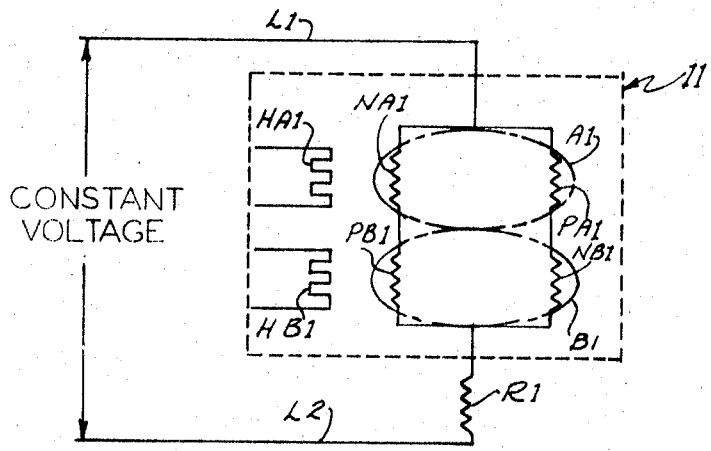
FIG. 1
FIG. 2
| IN A | IN B | OUT |
|---|---|---|
| 0 | 0 | 0 |
| 1 | 0 | 1 |
| 0 | 1 | 1 |
| 1 | 1 | 0 |
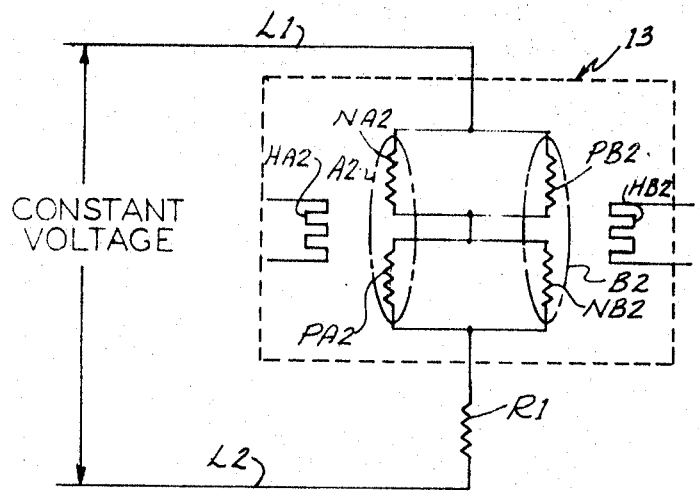
FIG. 3
FIG. 4
| IN A | IN B | OUT |
|---|---|---|
| 0 | 0 | 1 |
| 1 | 0 | 0 |
| 0 | 1 | 0 |
| 1 | 1 | 1 |
Hans G. Hirsbrunner
Inventor.
Koenig, Senniger,
Powers and Leavitt,
Attorneys.

Aug. 12, 1969   H. G. HIRSBRUNNER   3,461,272
ELECTRO-THERMAL LOGIC APPARATUS
Filed Sept. 18, 1967   2 Sheets-Sheet 2

United States Patent Office 3,461,272
Patented Aug. 12, 1969

3,461,272
ELECTRO-THERMAL LOGIC APPARATUS
Hans G. Hirsbrunner, South Attleboro, Mass., assignor to Texas Instruments Incorporated, Dallas, Tex., a corporation of Delaware
Filed Sept. 18, 1967, Ser. No. 668,509
Int. Cl. H05b 1/02
U.S. Cl. 219—505      10 Claims

ABSTRACT OF THE DISCLOSURE

Various logic gates are disclosed which employ thermistors in various combinations to switch the state of energization of an electrical load in response to predetermined combinations of input signals. The input signals are in the form of heat applied to various ones of said thermistors. By thermally coupling thermistors of opposite temperature coefficient types so-called exclusive OR gate and so-called X gate functions are provided.

---

This invention relates to logic apparatus and more particularly to such apparatus employing electrothermal elements such as thermistors.

In various control applications, such as multizone heating and air-conditioning systems, the time of response of the associated control apparatus is typically not highly significant. Accordingly, switching and logic operations may be performed by elements which respond relatively slowly, e.g., electro-thermal elements such as thermistors. The use of electro-thermal control elements is advantageous because of their simplicity, reliability and relatively low cost. To provide flexibility in designing and in operation however, it is important that various logic control operations be available such as are afforded by electronic components in the computer and automation arts.

Among the several objects of the present invention may be noted the provision of logic apparatus which will switch the state of energization of a load in response to various combinations of input signals; the provision of such apparatus in which the input signals may be in the form of temperature changes; the provision of such apparatus in which the energization of the load is controlled according to a predetermined logic pattern; the provision of such apparatus which is highly reliable and the provision of such apparatus which is relatively simple and inexpensive. Other objects and features will be in part apparent and in part pointed out hereinafter.

Briefly, logic control apparatus of this invention includes a set of at least four thermistors, there being at least two thermistors each of opposite temperature coefficient types. Each thermistor in the set is thermally coupled to a respective thermistor of the opposite temperature coefficient to form respective pairs of thermistors. Each such pair is provided with respective means for applying heat to the pair. An electrically energizable load is interconnected in a circuit with the thermistors and with a source of electrical power so that the energization of the load is controlled as a function of conduction through predetermined combinations of the thermistors. Accordingly, the state of energization of the load is switched in response to the application of heat to said pairs of thermistors according to a predetermined logic pattern. In one aspect of the invention, the pairs are interconnected to provide an exclusive OR gate function and in another aspect the pairs are interconnected to provide a so-called X gate function.

The invention accordingly comprises the constructions hereinafter described, the scope of the invention being indicated in the following claims.

In the accompanying drawings, in which several of various possible embodiments of the invention are illustrated, FIG. 1 is a schematic circuit diagram of an exclusive OR gate of this invention connected to selectively energize an electrical load from a constant voltage source;

FIG. 2 is a logic table illustrating the operation of the gate of FIG. 1;

FIG. 3 is an X gate of this invention also arranged to selectively energize an electrical load from a constant voltage source;

FIG. 4 is a logic table illustrating the operation of the gate of FIG. 3;

Corresponding reference characters indicate corresponding parts throughout the several views of the drawings.

Figure 5:
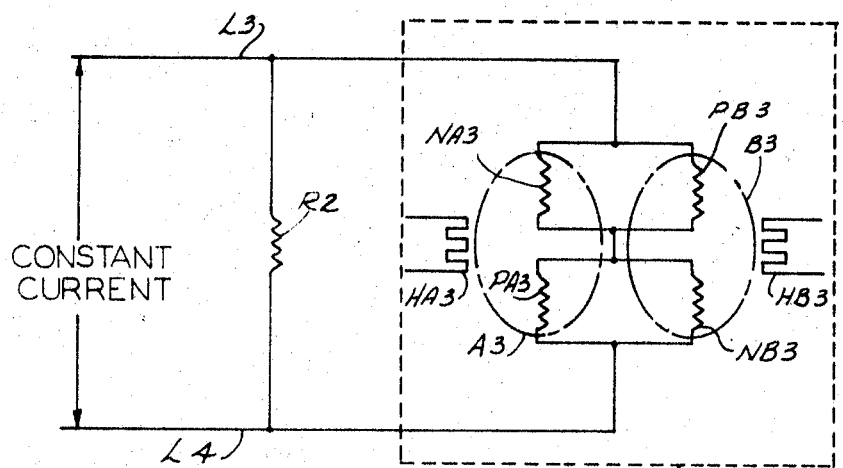
FIG. 5 is a schematic circuit diagram of an exclusive OR gate of this invention interconnected for selectively energizing an electrical load from a constant current source.

Referring now to FIG. 1, there is indicated at 11 generally an electro-thermal logic gate providing an exclusive OR function. An electrically energizable load is represented by a resistor R1. This load may for example be constituted by a control device which is to be selectively energized, e.g., a solenoid or other actuator, or it may be a heater which, as will be apparent hereinafter, comprises an input element for further electro-thermal logic circuitry. Gate 11 and load resistor R1 are connected in series across a constant voltage source through a pair of supply leads L1 and L2 so that the load resistor R1 is energized when conduction is permitted through gate 11. The source may provide either A.C. or D.C.

Gate 11 includes a set of four thermistors two of which, NA1 and NB1, are of the NTC (negative temperature coefficient of resistivity) type and two of which, PA1 and PB1, are of the PTC (positive temperature coefficient of resistivity) type. As is indicated by the broken line loops linking pairs of thermistors, each thermistor in the set is thermally coupled to a respective thermistor of the opposite temperature coefficient type; that is, NTC thermistor NA1 is thermally coupled to or in heat exchange relationship with PTC thermistor PA1 thereby comprising a pair designated generally at A1 and NTC thermistor NB1 is thermally coupled to or in heat exchange relationship with PTC thermistor PB1 thereby comprising a pair designated generally at B1.

Thermistor NA1 is connected in series with thermistor PB1 and thermistor PA1 is connected in series with thermistor NB1. The two series strings are connected in parallel as illustrated in FIG. 1 thereby to provide alternate possible paths of conduction through gate 11 to the load resistor R1.

The thermistor pair A1 is also in heat exchange relationship with a heater HA1 and the thermistor pair B1 is in heat exchange relationship with a heater HB1. As is described in greater detail hereinafter gate 11 responds to thermal input signals and the heaters HA1 and HB1 provide a convenient means for converting electrical signals to such thermal input signals. However, it should be understood that other variable temperature sources may be employed as controlling inputs to gate 11, e.g., ambient temperature changes, furnace temperatures, etc., and the means for applying heat from such sources to the thermistor may comprise merely means for placing or supporting the thermistors in heat exchange relationship with such sources.

The thermistors comprising gate 11 are preferably constructed of materials which exhibit relatively abrupt changes in resistance at predetermined temperature thresholds. Preferably also, the thresholds of the different thermistors are at about the same temperature level. Thus, as the temperature of one of the other of the thermistor pairs A1 or B1 is varied past the predetermined temperature threshold, both of the thermistors comprising that pair will experience relatively large changes in resistance value.

As the load resistor R1 is connected in series with the gate 11 across a constant voltage source, it will be seen by those skilled in the art that the load will be energized when a current path is provided through the gate by thermistors which are in their low resistance states but will be substantially deenergized if all of the possible current paths are blocked by thermistors which are in relatively high resistance states. In the logic table of FIG. 2, the various possible combinations of thermal inputs to the thermistor pairs A1 and B1 are indicated in the columns headed "In A" and "In B" respectively. In these columns the application of heat, e.g., by energization of the respective heater, is indicated by the binary digit 1 whereas no thermal input is indicated by the binary digit 0. The energization of the load resistor R1 is indicated in the column headed "Out," the energization of the load being indicated by a binary 1 and its deenergization by the binary 0.

When all of the four thermistors are at a relatively cool temperature, e.g., at normal ambient temperature, one of the two possible paths of conduction between the voltage source and load resistor R1 is blocked by the high resistance of NTC thermistor NA1 and the other possible path is blocked by the high resistance of NTC thermistor NB1. If heater HA1 alone is energized so that the temperature of the thermistor pair A1 is raised above the thresholds of thermistors NA1 and BA1, a conduction path will exist through the relatively hot NTC thermistor NA1 and the relatively cool PTC thermistor PB1 and thus the load resistor R1 will be energized. Similarly, if only heater HB1 is energized, a conduction path will exist through the low resistances of PTC thermistor PA1 and NTC thermistor NB1. Thus, in this state also, load resistor R1 will be energized. If, however, both heaters HA1 and HB1 are energized, one of the possible conduction paths is blocked by the high resistance of PTC thermistor PB1 and the other is blocked by the high resistance of PTC thermistor PA1. Accordingly, it can be seen that the state of energization of load resistor R1 is switched between energization and deenergization according to a so-called exclusive OR gate logic pattern as represented in FIG. 2.

In the embodiment illustrated in FIG. 3, the load resistor R1 is connected across the supply leads L1 and L2 through an electro-thermal gate 13 which, as described hereinafter, provides energization of resistor R1 according to an X gate pattern of logic. Gate 13 includes two NTC thermistors NA2 and NB2 which are essentially similar to the thermistors NA1 and NB1 of FIG. 1 and includes also two PTC thermistors PA2 and PB2 which are essentially similar to the thermistors PA1 and PB1 of FIG. 1. Thermistors NA2 and PA2 are thermally coupled to each other thereby to constitute a pair of thermistors designated generally at A2. Thermistors NB2 and PB2 are thermally coupled together thereby constituting a pair of thermistors which are designated generally at B2. NTC thermistor NA2 is connected in parallel with PTC thermistor PB2 while NTC thermistor NB2 is connected in parallel with PTC thermistor PA2. The two parallel circuits are then themselves connected in series as illustrated in FIG. 3 thereby providing a variety of possible paths of conduction through the gate 13.

A heater HA2 is arranged for applying heat to the thermistor pair A2 so as to selectively raised its temperature above the transition thresholds of thermistors NA2 and PA2 and a heater HB2 is similarly arranged for applying heat to the thermistor pair B2.

As is illustrated in the logic table of FIG. 4, the load resistor R1 is energized only when the heaters HA2 and HB2 are either both energized or both deenergized. When both heaters are deenergized, a conduction path exists through the two PTC thermistors PB2 and PA2. When both heaters are energized, a conduction path exists through the two NTC thermistors NA2 and NB2. However, if only heater HA2 is energized, both the PTC thermistor PA2 and the NTC thermistor NB2 will be in their high resistance conditions and thus all possible conduction paths to the resistor R1 will be blocked. Similarly, if only the heater HB2 is energized, both the PTC thermistor PB2 and the NTC thermistor NA2 will be in their high resistance states and again all possible conduction paths to the resistor R1 will be blocked by a relatively high resistance element. Accordingly, the energization of load resistor R1 follows the X gate logic pattern represented in FIG. 4.

In the embodiment illustrated in FIG. 5, a load resistor R2 is connected in parallel with an electro-thermal gate 15. In other words, the gate 15 shunts the load resistor R2. A substantially constant current is supplied to the parallel combination of the load resistor and the gate through a pair of supply leads L3 and L4. Thus, when the gate 15 is in a nonconducting state, the current supplied through leads L3 and L4 will flow through and energize the load resistor R2 whereas when the gate is in a conducting state the current will be shunted away from resistor R2 thereby substantially deenergizing it.

Gate 15 comprises a pair of NTC thermistors NA3 and NB3 and a pair of PTC thermistors PA3 and PB3. NTC thermistor NA3 is thermally coupled to PTC thermistor PA3 thereby constituting a thermistor pair A3 while NTC thermistor NB3 is thermally coupled to PTC thermistor PB3 thereby constituting a thermistor pair B3. Each of the thermistor pairs A3 and B3 is provided with a respective heater, HA3 and HB3, for applying a thermal input signal thereto. NTC thermistor NA3 is connected in parallel with PTC thermistor PB3 while NTC thermistor N3B is connected in parallel with PTC thermistor PA3. The two parallel circuits are then connected in series across the load resistor R2.

When neither heater HA3 or HB3 is energized, a conduction path exists through the two PTC thermistors PB3 and PA3 so that current is shunted away from the load resistor R2 and the load resistor is therefore deenergized. If only the heater HA3 is energized, both the PTC thermistor PA3 and the NTC thermistor NB3 will be in high resistance states and thus all possible conduction paths through the gate 15 will be blocked. The constant current provided by the source will therefore flow substantially entirely through the load resistor R2 thereby energizing it. Similarly, if only the heater HB3 is energized, both the PTC thermistor PB3 and the NTC thermistor NA3 wil be in high resistance states thereby blocking conduction through gate 15 and causing energization of the load resistor R2. If, on the other hand, both of the heaters HA3 and HB3 are energized, a conduction path through gate 15 will exist through NTC thermistors NA3 and NB3, which conduction path will shunt current away from and deenergize the load resistor R2. It can thus be seen that the energization of the load resistor R2 follows the exclusive OR logic represented in the table of FIG. 2.

Figure 6:
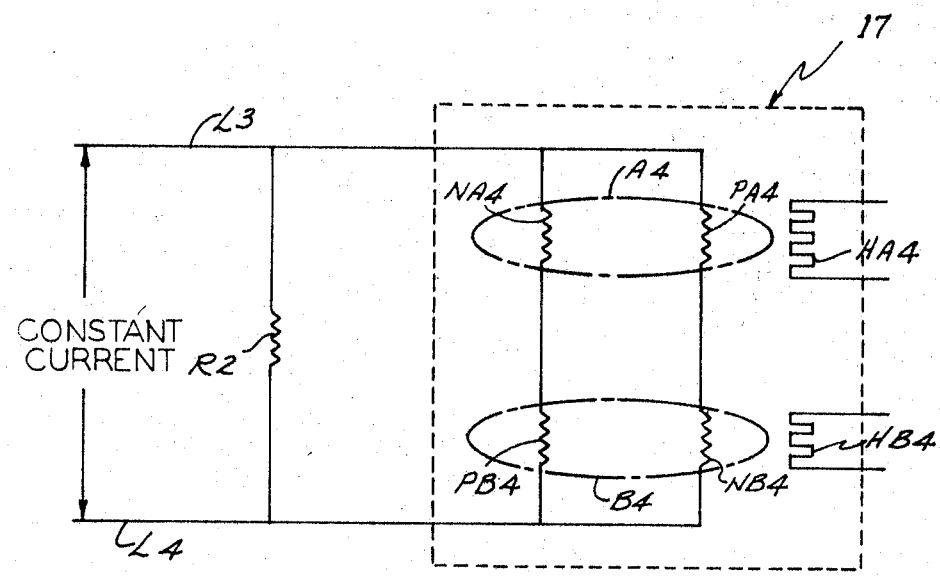
FIG. 6 is a schematic circuit diagram of an X gate of this invention also interconnected for energizing a load from a constant current source.

In the embodiment illustrated in FIG. 6, the load resistor R2 is connected in parallel with an electro-thermal gate 17 across the leads L3 and L4 which provide a substantially constant current to the parallel connected combination. Gate 17 comprises two NTC thermistors NA4 and NB4 and two PTC thermistors PA4 and PB4. Thermistors NA4 and PA4 are thermally coupled to one another to constitute a thermistor pair A4 and thermistors NB4 and PB4 are thermally coupled together to constitute a thermistor pair B4. A heater HA4 is arranged for selectively applying heat to the thermistor pair A4 and heater HB4 is arranged for selectively applying heat to the pa⸱-

B4. NTC thermistor NA4 is connected in series with PTC thermistor PB4 and NTC thermistor NB4 is connected in series with PTC thermistor PA4. The two series connected sets of thermistors are connected in parallel to provide alternate possible conduction path through the gate 17 as illustrated in FIG. 6. If neither heater HA4 or HB4 is energized, one of the possible conduction paths through gate 17 is blocked by the high resistance of NTC thermistor NA4 and the other possible path is blocked by the high resistance of thermistor NB4. Accordingly, the current supplied through leads L3 and L4 will flow substantially entirely through the load resistor R2 thereby energizing it. If the heater HA4 alone is energized, a conductive path through gate 17 will exist through thermistors NA4 and PB4 and connection through this path will shunt the supply current away from load resistor R2 thereby deenergizing it. Similarly, if heater HB4 alone is energized, a conductive path through gate 17 will exist through thermistors PA4 and NB4 thereby shunting and and deenergizing the load resistor R2. However, if both heaters HA4 and HB4 are simultaneously energized, the load resistor R2 will be energized since the two possible shunting paths are blocked by the high resistances of thermistors PB4 and PA4, respectively. The gate 17 thus functions as an X gate following the logic pattern represented in FIG. 4.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Logic apparatus comprising:
    a set of at least four thermistors including at least two thermistors each of opposite temperature coefficient types;
    means for thermally coupling each thermistor in said set to a respective thermistor of the opposite temperature coefficient type in said set to form respective pairs of thermistors;
    respective means for selectively applying heat to each of the thermally coupled pairs of thermistors;
    an electrically energizable load; and
    circuit means interconnecting said thermistors and said load with a source of electrical power for controlling the energization of said load as a function of conduction through predetermined combinations of said thermistors whereby the state of energization of said load is switched in response to the application of heat to said pairs of thermistors according to a predetermined logic pattern.

2. Apparatus as set forth in claim 1 wherein a PTC thermistor is one of said pairs is connected in series with an NTC thermistor in a second of said pairs and a PTC thermistor in said second pair is connected in series with an NTC thermistor in said one pair and wherein the aforesaid series circuits are connected in parallel.

3. Apparatus as set forth in claim 2 wherein the paralleled series circuits are connected in series with said load for connection across a source providing a substantially constant voltage.

4. Apparatus as set forth in claim 2 wherein the paralleled series circuits are connected shunting said load for connection to a source providing a substantially constant current.

5. Apparatus as set forth in claim 1 wherein a PTC thermistor in one of said pairs is connected in parallel with an NTC thermistor in a second of said pairs and a PTC thermistor in said second pair is connected in parallel with an NTC thermistor in said one pair and wherein the aforesaid parallel circuits are connected in series.

6. Apparatus as set forth in claim 5 wherein the series connected parallel circuits are connected in series with said load for connection across a source providing a substantially constant voltage.

7. Apparatus as set forth in claim 5 wherein the series connected parallel circuits are connected shunting said load for connection to a source providing a substantially constant current.

8. Apparatus as set forth in claim 1 wherein the resistance characteristic of each of said thermistors includes a transition temperature above which the thermistor resistance changes relatively abruptly.

9. Apparatus as set forth in claim 1 wherein said means for selectively applying heat to said thermistor pairs are respective electrically energizable heaters.

10. Apparatus as set forth in claim 1 wherein said load is an electrically energizable heater.

References Cited

UNITED STATES PATENTS 3,280,340  10/1966  Anderson et al. ____ 340—173.1
3,288,780  11/1966  Clapper _____ 340—173.1

BERNARD A. GILHEANY, Primary Examiner

F. E. BELL, Assistant Examiner

U.S. Cl X.R.

340—173